United States Patent

Knight

[15] 3,698,022
[45] Oct. 17, 1972

[54] BUNK FOR A TRUCK CAB SLEEPING BERTH

[72] Inventor: Tom H. Knight, 7710 Popular, Commerce City, Colo. 80022

[22] Filed: Dec. 28, 1970

[21] Appl. No.: 101,464

[52] U.S. Cl. .................................5/118, 5/9, 296/24
[51] Int. Cl. ............................B60p 3/32, A45f 1/00
[58] Field of Search..........5/9, 93, 94, 118, 120, 127, 5/129, 200, 207, 210; 296/23, 24

[56] References Cited

UNITED STATES PATENTS

| 3,524,673 | 8/1970 | Cramer et al. | 5/118 X |
| 854,900 | 5/1907 | Miller | 5/200 R |
| 3,231,304 | 1/1966 | Coup | 5/118 |
| 3,454,968 | 7/1969 | Beckman | 5/94 |
| 366,312 | 7/1887 | Farrar | 5/200 R |
| 1,444,726 | 2/1923 | Broyles | 5/210 |

Primary Examiner—Casmir A. Nunberg
Attorney—Richard D. Law

[57] ABSTRACT

Apparatus for suspending a mattress in a truck cab cleeping berth to form a sleeping bunk includes a frame-mounted wire web supported between upright posts by inclined tension springs. Spaced tension springs at the ends and spaced anti-sag wires at the sides mount the wire web in the frame. A variable shock obsorber is provided for adjusting the unit to the weight of the user.

4 Claims, 5 Drawing Figures

PATENTED OCT 17 1972
3,698,022
SHEET 1 OF 2
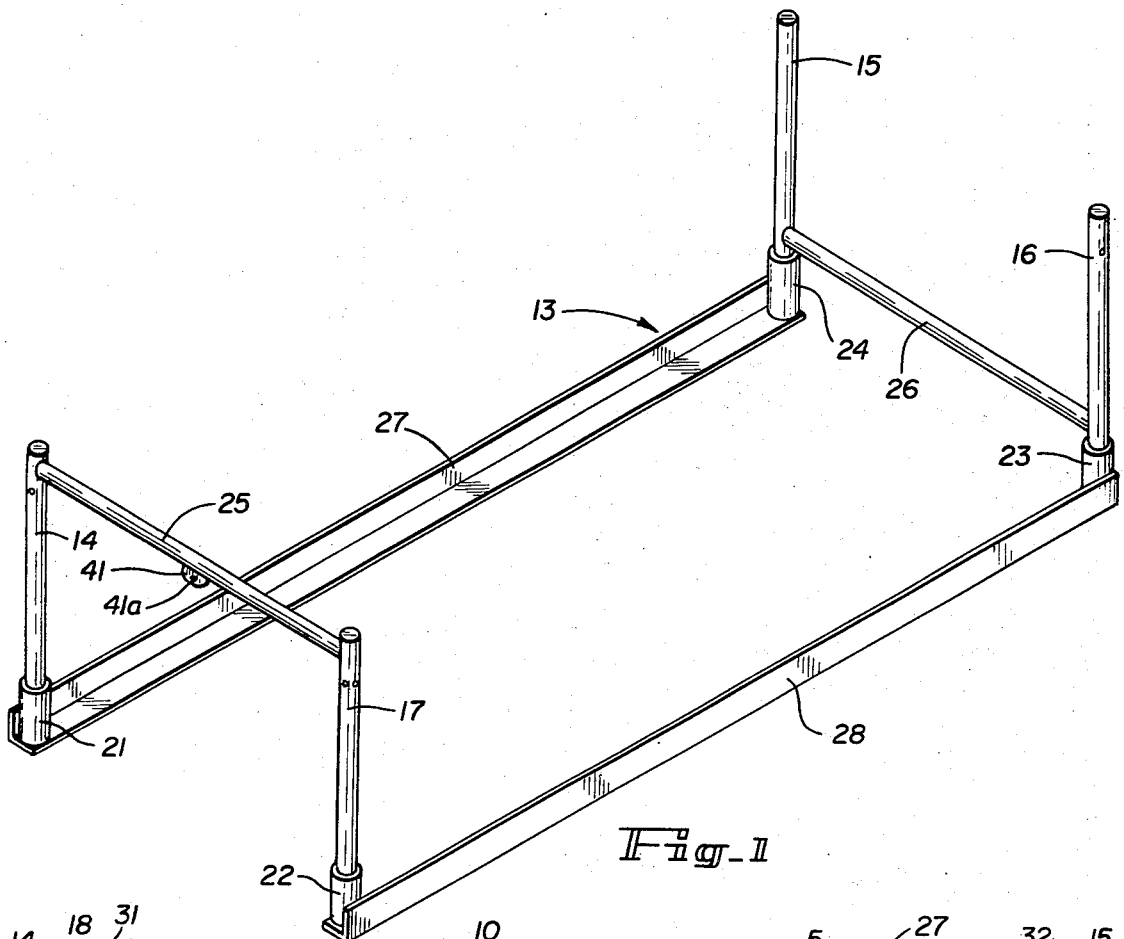
Fig_1
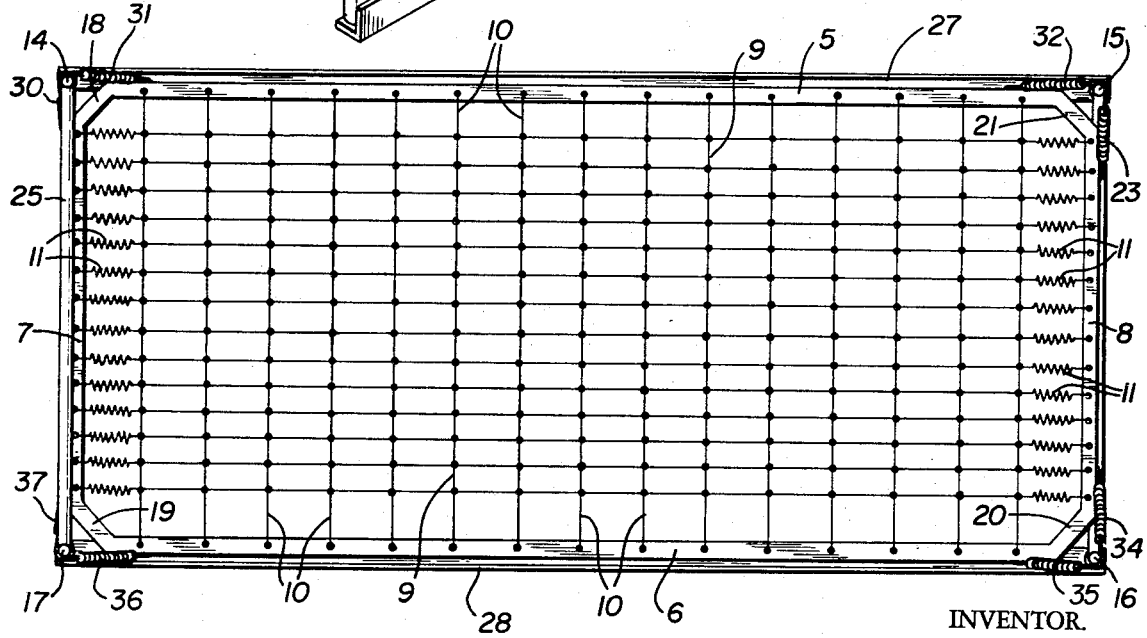
Fig_2
INVENTOR.
TOM H. KNIGHT
BY Richard D. Law
ATTORNEY

INVENTOR.
TOM H. KNIGHT

BY Richard D. Law

ATTORNEY

BUNK FOR A TRUCK CAB SLEEPING BERTH

Restful, refreshing sleep for most passengers in moving vehicles, particularly trucks, is extremely difficult. In the trucking industry, long duration stops for sleeping cannot be economically made. An interstate movement of a truck's cargo economically requires almost continual travel of the truck with minimum stopping time for a few necessary stops. Many trucks involved in long-distance hauling carry two men, who alternate between sleeping and driving. To these teams of truck drivers, a restful sleep while not driving is critical. The safety of the cargo, of the vehicle, and of other motorists, depends upon the driver being alert.

Since sleeping in a sitting position in a truck cab is not restful because of necessarily cramped leg room and jostling about due to the truck's motion, larger trucks are provided with sleeping berths in the cab behind the driver's seat wherein the alternate driver may lie down. Even in the reclined position, sleeping is sometimes difficult because of the truck's motion. In conventional berths, over rough roads, a person in the berth is bounced up-and-down; as the truck rounds sharp curves, he is pushed by centrifugal force towards the cab sides; and during stops, starts, and abrupt gear shifts, he is rolled back and forth.

Accordingly, the apparatus of the invention provides structure to suspend a mattress in a truck's cab sleeping berth in such a manner that a person lying upon the mattress will experience a generally smooth ride regardless of motion or jolting of the truck cab, particularly on rough roads. The mattress supporting structure is mounted on inclined tension springs with shock absorbing means to smooth bouncing up-and-down motion. Other means are provided in the supporting structure to restrict harmonic bouncing movement, and other means prevents mattress sag. The arrangement restricts movement in the berth due to centrifugal forces. Generally rigid means is provided to reduce excess sway as the truck stops, starts, or otherwise changes its speed.

An important object of the present invention is to provide a mattress-suspending structure for use in a truck sleeping berth to provide a generally smooth ride for a person lying upon the mattress while the truck is in motion.

Another object of the invention is to provide a structure as heretofore mentioned which includes suspending the mattress with springs and a shock absorber device.

Still another object of the invention is to provide a structure as heretofore mentioned which includes means for adjusting to the weight of the user of the mattress.

Yet another object of the invention is to provide mattress suspending apparatus which eliminates mattress sag, and greatly restricts swinging movements of the mattress on acceleration or decceleration of the truck in which invention is mounted.

These and other objects and advantages of the present invention are readily apparent upon consideration of the following description and appended illustrations, in which:

FIG. 1 is a detail of the invention;

FIG. 2 is a plan view of apparatus according to the invention;

Figure 3:
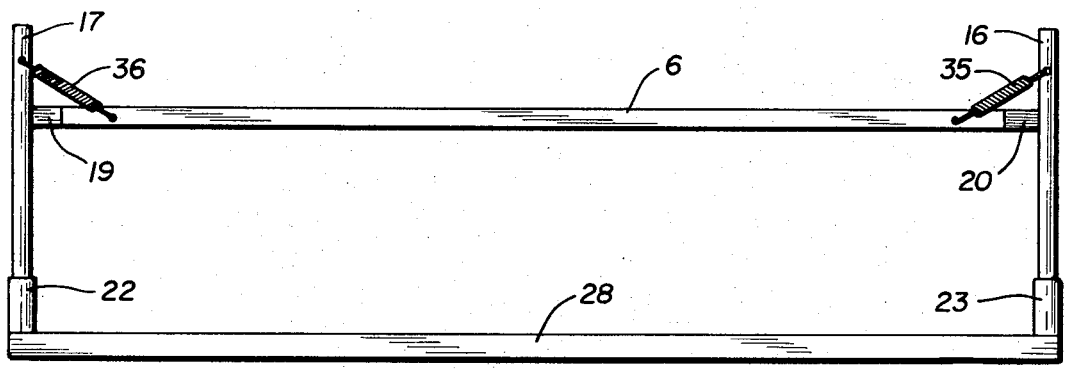
FIG. 3 is a side view of apparatus according to the invention.

In FIG. 2, an elongated frame has the general shape of a rectangle with longitudinal sides 5 and 6, respectively, and transverse ends 7 and 8, respectively. Such a frame is easily fabricated from sections of angle iron welded together. The frame surrounds and supports a generally rectangular section of wire mesh 9. Such wire mesh sections, being a wire grid, are conventional. As will be apparent hereinafter, other materials, such as nylon webbing, may be substituted for the preferred wire mesh 6. A recommended size for the frame is about 32 by 77 inches, and for the wire mesh section is about 32 by 70 inches. At the frame sides, 5 and 6, the wire mesh is supported by a plurality of spaced anti-sag wires 10 extending from the frame sides to the mesh section. About 15 of such wires are suggested. The wires 10 may be attached to the frame sides in numerous manners; forming holes in the frame side members and hooking the wires into the holes is one manner of attachment. The wires 10 may be wires from mesh 9 or may be added wires.

At frame ends 7 and 8, wire mesh 9 is supported by a plurality of tension springs 11, spaced along the frame end members. Such tension springs are conventional hardware items, which may easily be attached to the frame end-members by looping through apertures formed therein. The springs may be attached at the mesh by twisting or welding. Eight springs in spaced relation along each frame end is suggested.

The assembly of frame and wire mesh is supported in a system of uprights, indicated in general by numeral 13 in FIG. 1. near Where a rectangular frame is utilized, a system of four uprights 14, 15, 16 and 17 is suggested, whereby one upright will be positioned adjacent each corner of the frame. The frame corners (18, 19, 20 and 21 in FIG. 2) may be truncated so as not to hang-up on the uprights. The uprights may be easily fabricated from three-quarter inch pipes whose bottom ends are telescoped into one inch base pipes 21, 22, 23, and 24. The system of uprights is stabilized by transverse members 25 and 26, and by base longitudinal members 27 and 28. Longitudinal base members 27 and 28 may be angle iron beams with base pipes 21 and 24 welded to the opposed ends of member 27 and with base pipes 22 and 23 welded to the opposed ends of member 28. Transverse members 25 and 16 may be pipes welded at the ends of the uprights. Transverse pipe 25 is near the top of the uprights to define a "head" end, and member 26 is near the bottom of the uprights to define a "foot" end.

Figure 4:
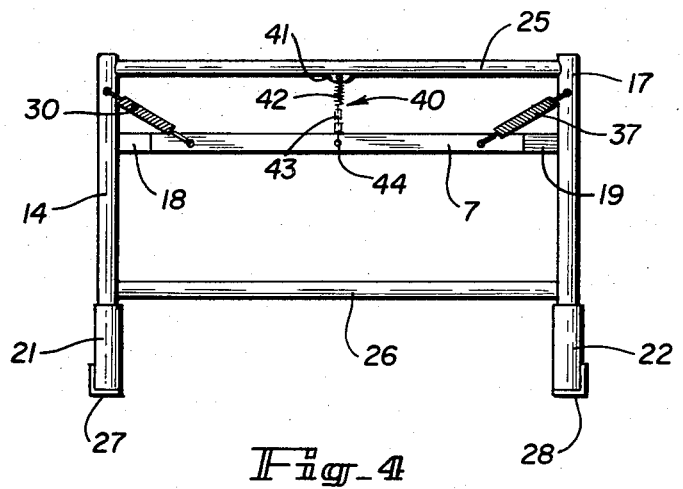
FIG. 4 is an end view of apparatus according to the invention.

A manner of supporting the frame between the uprights is shown in FIGS. 2, 3 and 4 wherein two inclined tension springs are connected at each upright and extend to opposed sides of the frame adjacent the corners. For example, at upright 15 in FIG. 2, spring 32 extends to a shallow angle to side 5 and spring 33 extends at a like angle to end member 8. Stiff springs set at shallow angles give good stability of the frame within the uprights.

Between transverse member 25 and frame end-member 7 is mounted variable shock absorbing means, indicated in general by numeral 40 in FIG. 4, which includes a bracket 41 mounted on member 25, a tension spring 42 pivotally to one end of bracket 41, the other end of spring 42 being selectively mounted on link chain 43 which connects to transverse frame member 7. Spring 42 may merely have conventional hook at its opposed ends, one of which hooks into member 24 and the other into a link chain 43. The chain 43 may be mounted by bolting to frame member 7. A shock absorber (dashpot) may be used in place of spring 42.

Figure 5:
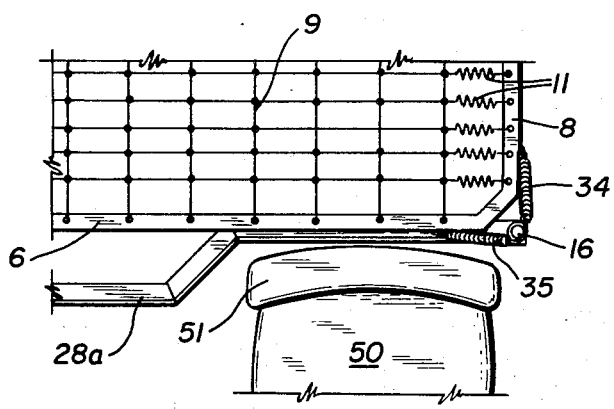
FIG. 5 is another embodiment of a detail of the apparatus according to the invention.

The upright system need not be rectangular, but may be tailored to the dimensions of a truck cab sleeping berth as in FIG. 5 wherein base rail 28a has been bent to accommodate back 51 of seat 50.

In operation, the system of upright 13 is positioned in a truck cab sleeping berth and the frame, including the wire mesh, hung therefrom. Upon the frame, supported by the mesh, may be laid a thin mattress; a 30 × 76 × 4 inch polyfoam mattress is suggested. Mechanism 40 may be adjusted according to the weight of the sleeper. The apparatus of the invention has been found in practice to permit a sleeper a particularly smooth and firm ride without jarring, jerking, or excess sway.

I claim:

1. Apparatus for suspending a mattress in a truck cab sleeping berth comprising:
   a. an elongated peripheral frame enclosing a greater extent of area than the mattress;
   b. a mesh member of about the extent of the mattress mounted in said frame;
   c. a first plurality of tension spring means mounted in spaced relation between the transverse ends of said frame and said mesh member for supporting said mesh member in said frame;
   d. a plurality of anti-sag wire means mounted in spaced relation between the longitudinal sides of said fram and said mesh member for supporting said mesh member in said frame in a manner restraining transverse movement of said mesh member;
   e. upright frame means for placement in the truck cab sleeping berth adjacent said frame including four uprights, one at each corner of said frame;
   f. a pair of springs mounted at each corner of said frame and each spring mounted independently on one said upright, each spring of each said pair of springs being mounted normal to the other and each said spring extending from an upper connection with the adjacent upright in a shallow angle downwardly to said frame; and
   g. a variable shock absorbing tension spring mechanism attached between the middle of one end of said frame and an end of said upright means.

2. Apparatus according to claim 1 wherein said upright means includes a horizontal member above said frame at said one end, for attaching said variable shock absorbing mechanism thereto.

3. Apparatus according to claim 1 wherein said variable shock absorbing mechanism includes adjustable length means connected to said one end of said frame;

4. Apparatus according to claim 3 wherein said adjustable length means includes a link chain.

* * * * *